(12) United States Patent
Moore

(10) Patent No.: US 7,438,496 B2
(45) Date of Patent: Oct. 21, 2008

(54) AUTO LOCKED MECHANISM

(76) Inventor: Simon Garry Moore, 18 Bronte Pl., Cambridge 2351 (NZ)

( * ) Notice: Subject to any disclaimer, the term of this patent is extended or adjusted under 35 U.S.C. 154(b) by 0 days.

(21) Appl. No.: 11/639,879

(22) Filed: Dec. 15, 2006

(65) Prior Publication Data
US 2007/0092332 A1     Apr. 26, 2007

(51) Int. Cl.
*F16B 7/10*     (2006.01)
(52) U.S. Cl. .............. 403/379.6; 403/109.5; 403/109.7; 403/341
(58) Field of Classification Search ............. 403/109.1, 403/109.5, 109.7, 377, 379.4, 379.6, 341
See application file for complete search history.

(56) References Cited

U.S. PATENT DOCUMENTS

| | | | | | |
|---|---|---|---|---|---|
| 3,042,433 | A | * | 7/1962 | Koen | 403/19 |
| 3,127,202 | A | * | 3/1964 | Koen | 403/19 |
| 3,473,202 | A | * | 10/1969 | Howard | 403/344 |
| 4,072,448 | A | * | 2/1978 | Loyd, Jr. | 418/60 |
| 4,154,545 | A | * | 5/1979 | Pinto et al. | 403/104 |
| 4,190,378 | A | * | 2/1980 | Stecklein | 403/146 |
| 4,981,389 | A | * | 1/1991 | Keon | 403/290 |
| 5,096,327 | A | * | 3/1992 | Ruland | 403/290 |
| D342,891 | S | * | 1/1994 | Marui | D8/396 |
| 5,851,084 | A | * | 12/1998 | Nishikawa | 403/344 |
| 6,574,846 | B1 | * | 6/2003 | Kang | 29/239 |
| 7,074,135 | B2 | * | 7/2006 | Moore | 473/296 |

* cited by examiner

*Primary Examiner*—Daniel P. Stodola
*Assistant Examiner*—Joshua T Kennedy
(74) *Attorney, Agent, or Firm*—Greer, Burns & Crain, Ltd.

(57) ABSTRACT

A securing apparatus, including: a deformable body, wherein the body is configured to provide a secure interference fit with at least one article to which it is fitted, and an aperture within the body, wherein the aperture is configured to accept a non-circular section of a releasing tool, wherein the securing apparatus is only unlocked by the operation of the releasing tool with respect to the body and is locked at all other times upon removal of the releasing tool.

10 Claims, 5 Drawing Sheets

Figure 1A:
Figure 1B:
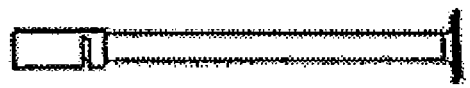
Figure 1C:
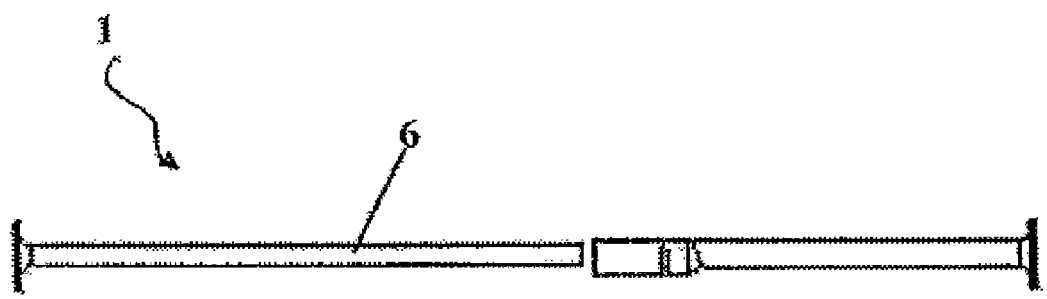
Figure 1D:

FIG.2A
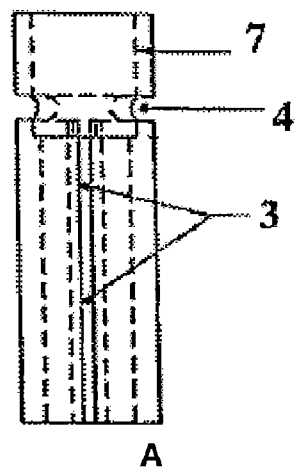
A
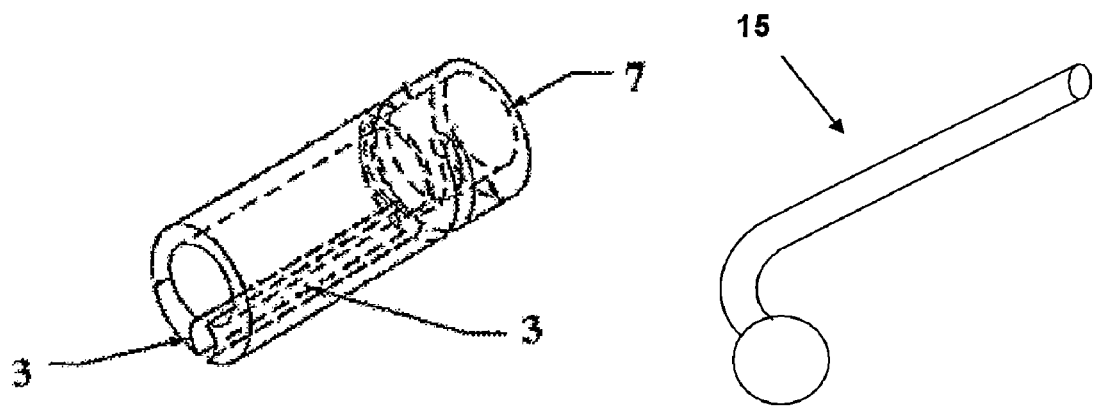
FIG.2B          FIG.2C
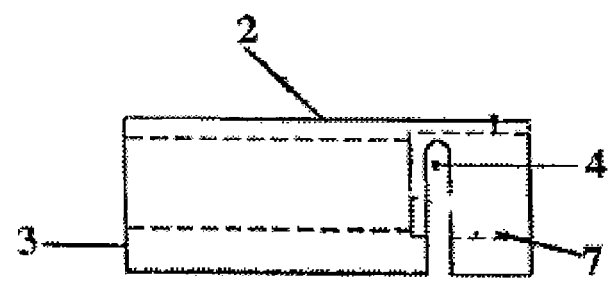
FIG.2D

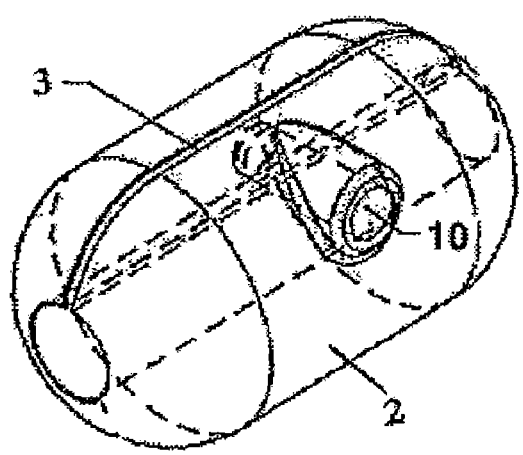
FIG.4A
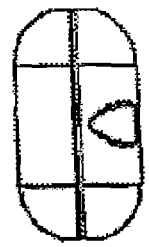   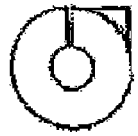   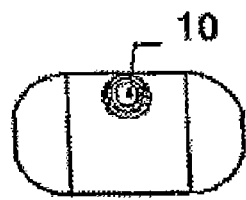
FIG.4B          FIG.4C          FIG.4D

AUTO LOCKED MECHANISM

TECHNICAL FIELD

This invention relates to an auto locked mechanism.

In particular the present invention is intended for use with securing adjustable length poles, and extendable mechanisms, and also to alternative methods of securing elements together.

BACKGROUND ART

In many industrial and consumer products there is a need to adjust the length of elements. Examples of such elements are telescoping tubes or pipes usually made of metal, but sometimes of other materials.

An example is ladders, scaffolding and props in the building industry, and bicycle seat posts, furniture, walking canes, tent poles, and ski poles in consumer products.

Any situation where there are telescoping elements, it can be an advantage to be able to more reliably secure the elements in a variety of positions relative to each other.

Present mechanisms act to secure the elements in a fixed position. An example is the twist lock on a ski pole where a friction bush secures the elements, by being compressed by rotation.

Often a clamp is used to reduce the diameter of the outer of the two telescoping elements. Another securing mechanism uses a grub screw or threaded bolt or threaded T-bar tool to lock up against the inner telescoping element.

In industrial situations it is very important that the fixing is very secure, as failure could lead to injury or death to people in the vicinity.

Securing mechanisms require the operator to have enough strength and knowledge to use the tools provided in the correct way to achieve a safe connection between the elements. For example a grub screw or bolt, if insufficiently tightened, may allow the components to telescope or rotate under load or stress.

Many of the mechanisms that exist now require several components and are unnecessarily heavy or complicated, which of course makes them more expensive to produce.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DESCRIPTION OF THE INVENTION

According to one aspect of the present invention there is provided a securing apparatus, including
    a deformable body, wherein the body is configured to provide an interference fit with at least one article to which it is fitted, and
    an aperture within the body, wherein the aperture is configured to accept a non-circular section of a releasing tool,
    characterised in that
    the securing apparatus is unlocked by the operation of the releasing tool with respect to the body and remains locked at all other times.

Throughout the present specification the term "locked" should be understood to mean that a force, significantly greater than that applied during the normal operation of the assembly to which the present invention is attached, will need to be applied to the present invention in order to cause the present invention to release the article to which it is secured.

It should be understood that in applications where safety may be an issue, (an example of which would be to secure pieces of scaffolding or framework etc,) the applied force necessary to cause the securing device to "slip" or to release the assembly, will need to exceed any safety limits or guidelines that may apply to the equipment or installation.

Within some preferred embodiments of the present invention the body will contain at least one ridge (or tooth) in order to improve the grip applied to the article to which the present invention is attached.

It should be understood that in some preferred embodiments of the present invention the article to which the present invention is attached will have a complementary recess into which a ridge or tooth will fit to further improve the strength of adhesion between the article and the present invention.

Throughout the present specification the term "unlocked" should be understood to mean that the present invention is able to be removed from, or moved with respect to, an article to which it has been, or will be, secured.

Within some preferred embodiments of the present invention the releasing tool includes a non-circular section, (such as a cam) which when inserted and rotated will elastically deform at least part of the body to increase the internal cross-section sufficiently, over at least part of the length of the body, to release any article that is being secured by the securing apparatus.

It should be appreciated that throughout the present specification the term "non-circular section" should be understood to mean items such as a cam, or any other shape or configuration which when inserted and/or rotated within an aperture that is constructed as part of the body of the present invention, will cause the present invention to be deformed from its resting position to a point where the present invention can be moved with respect to the article to which it was, or is intended to be, secured.

Within some preferred embodiments of the present invention the securing apparatus, or at least the body of which, will be permanently fixed to, or constructed as part of, an article other than the article to which it is intended to be secured.

It should be appreciated however that in some other embodiments of the present invention the securing apparatus is temporarily affixed to an article including those that can be adjustable in length.

It should be appreciated that in some other preferred embodiments of the present invention the securing apparatus co-joins a plurality of articles, and in some of these embodiments each article can be released from the present invention individually.

It should be understood that in most preferred embodiments of the present invention at least one side of the aperture is bisected by a slot that is substantially perpendicular to the axis of the aperture, wherein the slot and/or the aperture can be terminated by a stress reduction device such as a substantially circular hole.

The inclusion of the slot allows each section of the aperture, ie the section each side of the slot, to be opened and operated individually thereby ensuring that the operation of the releasing tool within one part of the aperture will not release an article to which another part of the aperture is secured.

In some preferred embodiments of the present invention there will be a plurality of apertures, wherein each aperture can be operated via a releasing tool so as to individually release an article.

It should be appreciated that the internal dimensions of the body of the securing device are smaller than the dimensions of the shaft/tube/pipe/rod, etc to which the present invention is to be fitted, as this will greatly improve the locking strength of the present invention onto such an article.

In all preferred embodiments of the present invention the removal of the releasing tool from the aperture will ensure that the securing device is in a locked position by default.

This is due to the inherent mechanical properties of the material(s) from which the body is constructed.

Operation of the releasing tool will cause a level of elastic deformation of the body and hence once the tool is removed the body will try to revert back to its normal "relaxed" state.

The relaxed dimensions of the body are such that it cannot be fitted onto the article that it is intended to secure and needs to be deformed by the releasing tool to a point where its dimensions are altered sufficiently to where it can fit onto the article.

Therefore, once the tool is released the body cannot revert to its former dimensions due to the presence of the article and it will therefore exert a force against the article that is hindering this action.

It is this force that provides the positive pressure between the body and the article and hence the interference fit that secures the two items together.

This action is equally applicable to securing an article to the interior surface of the body or to securing an article to the exterior surface of the body.

An example of securing an article to the interior surface of the body would be where an adjustable length rod is needed, as the rod would need to be able to move through the interior of the body to the desired position before being secured.

An example of securing an article to the exterior surface of the body would be where a streamlined connection of two or more tubes is desired as the body would not stand proud of the exterior surfaces of the tubes.

It should be appreciated that in some preferred embodiments of the present invention the releasing tool is constructed with a threaded section and is configured so that the securing apparatus is unlocked by the insertion of the releasing tool into a complementary threaded area of the body, or of the aperture, to a point wherein the required widening of an area of the aperture is achieved.

In some preferred embodiments of the present invention the releasing tool is tapered or has a non-uniform cross-section (eg a dovetailed or wedged section) configured so that the releasing tool is pushed into the aperture in order to spread the aperture to a point where the previously secured article is now insecure or unlocked, or to the point where the present invention can be fitted over part of an article to which it is intended to be secured.

In preferred embodiments of the present invention the body is configured to include at least one seal wherein the seal is configured to stop any leakage of material from within a secured article.

It should be appreciated that in most embodiments of the present invention the internal shape of the body will be circular.

However, this should not be seen to be a limitation on the present invention in any way as in other embodiments the body can be non-circular, eg oval, rectangular, triangular etc.

It should be clearly understood that the present invention is equally suited to securing tubular items as well as solid items and that tubular items may be secured by their internal surface or their external surface.

According to another aspect of the present invention as provided a method of operating a securing apparatus comprising:

a deformable body, wherein the body is configured to provide a secure interference fit with at least one article to which it is fitted, and an aperture within the body, wherein the aperture is configured to accept a non-circular section of a releasing tool, characterised by the step of inserting the non-circular section of the releasing tool within the aperture until the securing apparatus is unlocked.

According to another aspect of the present invention as provided a method of operating a securing apparatus comprising:

a deformable body, wherein the body is configured to provide a secure interference fit with at least one article to which it is fitted, and an aperture within the body, wherein the aperture is configured to accept a non-circular section of a releasing tool, characterised by the step of inserting and partially rotating the non-circular section of the releasing tool within the aperture until the securing apparatus is unlocked.

According to another aspect of the present invention there is provided a releasing tool for a securing apparatus as previously disclosed, characterised in that the releasing tool is configured to operate with respect to the body in order to unlock the securing assembly.

In some preferred embodiments of the present invention the releasing tool is configured as a cam.

In some other preferred embodiments of the present invention the releasing tool is threaded.

In some other preferred embodiments of the present invention the releasing tool has a wedge-like configuration.

It is clear from the aforegoing description that the present invention has many significant advantages over other forms of connector, particularly in areas where safety is concerned such as the construction industry, as a simple glance at the fitted securing apparatus can ascertain whether the releasing tool is present or not, as if the releasing tool is not present the securing apparatus must be in the locked position.

This simple fact ensures that items such as scaffolding joints can be seen to be securely fitted as there is no partial securing of these elements as they will either be locked or unlocked.

This overcomes a serious problem with the present mechanisms that are available as these are generally tightened with an Allen key (or other securing device) in a manner that allows for partial securement to be achieved and which can then cause the subsequent collapse of the structure.

Another significant advantage of the present invention is that it can be constructed to operate to either secure an article by gripping the articles outer surface, or to fit inside and secure an article by gripping its' inner surface.

A combination of these systems can also be used e.g. to secure the inner surface of an article to a stud or rod-like structure.

Due to the simplicity of the design of the present invention it is envisaged that they can also be used in the construction of various mechanical assemblies, including miniature devices or any other size of device where the positive securing of a device to another device or into a preferred position is needed.

This can include items such as window frames, hinges, etc. and can be used to replace nuts or other fastenings in a variety of applications.

Another advantage of the present invention is that the operation of the releasing tool can be used to not only remove the securing device from the article but also to adjust the position of the article with respect to the securing device or another article to which the securing device is adjoined.

DESCRIPTION OF VIEWS OF THE INVENTION

FIGS. 1A-1D: Are diagrammatical representations of a trench prop with an auto locked mechanism in various stages of assembly and extension.

FIGS. 2A-2D: Are diagrammatical representations of an auto locked mechanism which uses a cam tool, the latter shown in FIG. 2C.

Figures 3A, 3B:
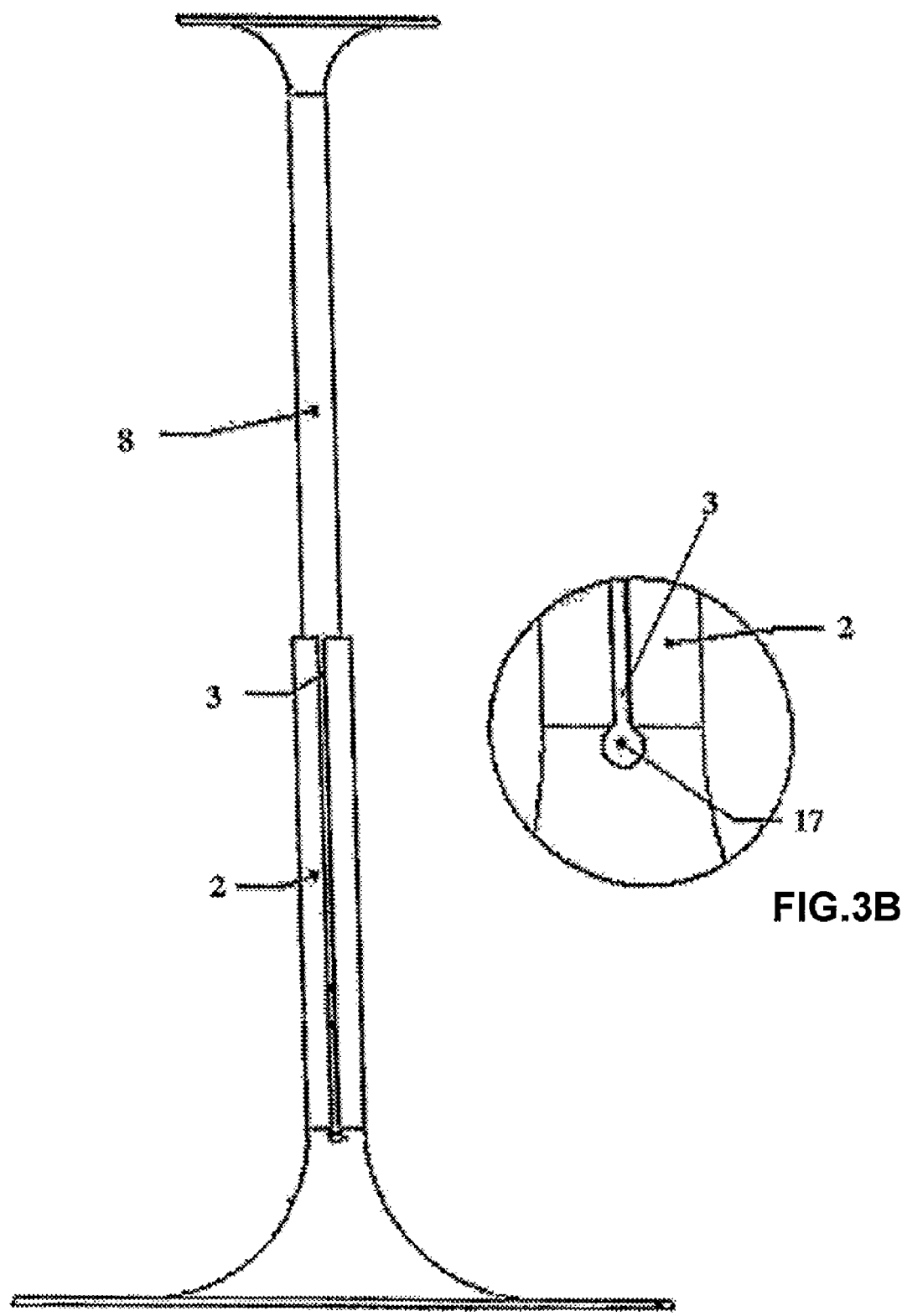
Figures 5A, 5B, 5C:
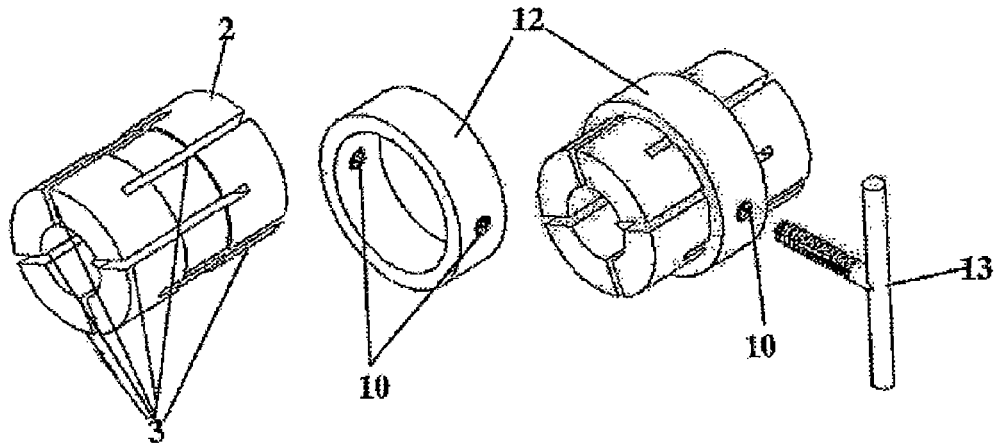
Figures 5D, 5E:
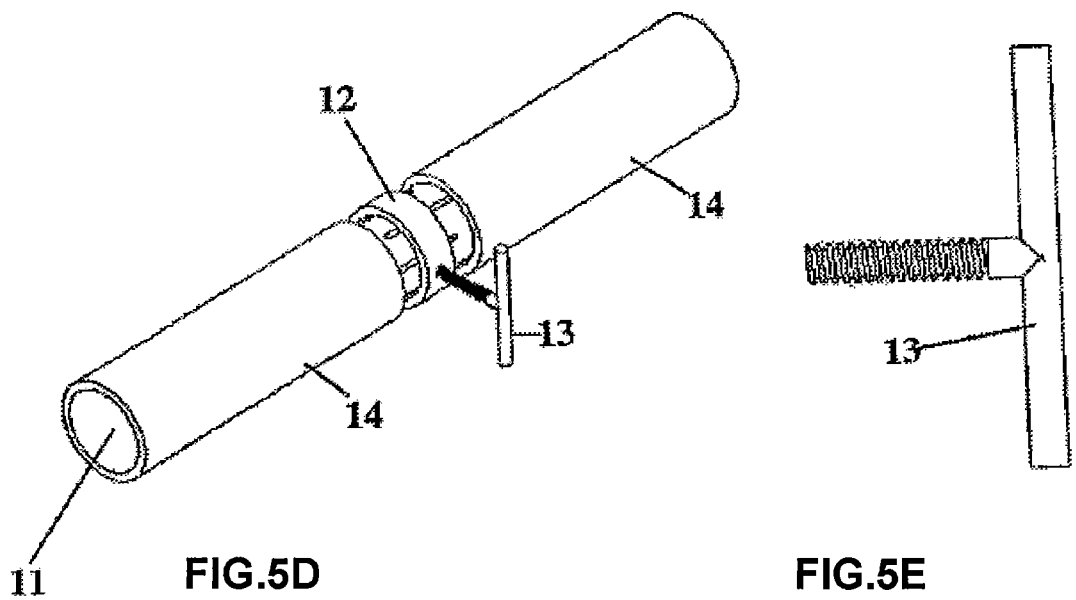

FIGS. 3A-3B: Are diagrammatical representations of a pedestal table base with an auto locked mechanism.

FIGS. 4A-4D: Are diagrammatical representations of an auto locked connector, which is an example of a mechanism that uses a threaded tool.

FIGS. 5A-5E: Are views of an auto locked connector for securing to articles by an internal surface.

BEST MODES FOR CARRYING OUT THE INVENTION

With reference to the figures there as illustrated a securing apparatus generally indicated by arrow 1.

The securing apparatus (1) consists of a body (2) and an aperture (3.)

Some embodiments also contain a side slot (4), particularly if the aperture (3) does not extend the full length of the body (2), or if the aperture (3) is split into separately operated sections.

FIGS. 1A-1D show the securing apparatus (1) fitted to the end of a hollow shaft (5).

The telescoping section (6) which has a smaller cross-sectional area is then secured by an area of the body (2) with a correspondingly smaller cross-sectional area to the area securing the hollow shaft (5).

It is necessary to adjust the position of the telescoping section (6) with respect to the shaft (5 )without affecting the locking of the securing apparatus (1) onto the shaft (5).

Therefore a side slot (4) bisects the aperture (3) so that each section of the securing apparatus (1) can be released separately.

FIGS. 2A-2D show a similar embodiment of the securing apparatus to that in FIGS. 1A-1D, however this embodiment has a non-aperture section (7) of the body (2) that can be permanently affixed to items such as the shaft (5).

It should be noted that the non-apertured section (7) can equally be constructed as part of a device or assembly, including a shaft (7) such as in FIGS. 1A-1D.

FIGS. 2A-2D clearly shows that this embodiment is to be operated with a cam style releasing tool 15 having an elongate non-circular section.

FIGS. 3A-3B show a pedestal table leg (8) that can have its length adjusted.

The securing apparatus 1 in this application is of an extended body length (2) in order to provide a large surface contact area between the body (2) and the leg (8) to increase the load that is able to be safely supported by the table leg (8).

It should be noted that the stress reduction device (9) can clearly be seen at the end of the aperture (3) in the close up view of FIG. 3B.

FIGS. 4A-4B show a typical securing apparatus (1) for securing two articles together.

A threaded releasing tool (13) is inserted into a complementarily threaded section (10) if the body (2) until the aperture (3) is opened sufficiently to allow the securing apparatus (1) to be moved over the parts of the two articles that are to be secured together.

The threaded releasing tool (13) is then removed so that the aperture (3) will try to close to its original position and will therefore secure the two articles together.

FIGS. 5A-5E show an alternative to the securing apparatus (1) in FIGS. 4A-4D, wherein the securing apparatus (1) is configured to join the two articles together by securing their internal surfaces (11) rather than their external surfaces as in FIGS. 4A-4D.

The body (2) includes a section (12) that can rotate around the body (2).

The rotating section (12) includes a threaded section (10).

The body (2) includes a number of apertures (3) at either end of the body (2), all of which extend only partially along the length of the body (2).

The threaded releasing tool (13) is inserted into the threaded section (10) which is positioned so that when fully inserted the releasing tool (13) will press against a section of the body (2) causing at least one aperture (3) and a section of the body (2) to deform to a point where (for example), a tube (14) can be fitted over one end of the securing apparatus (1).

Once the releasing tool (13) is at least partially removed the body (2) and apertures (3) will try to assume their previous positions and thereby will secure the tube (14) by its inside surface.

The rotating section (12) is then moved to a position where the releasing tool (13) can be wound in to deform a corresponding aperture (3) and section of the body (2) at the opposite end of the securing apparatus (1) in order that the process can be repeated to secure the second tube (14) to the securing apparatus (1).

Aspects of the present invention have been discussed by way of example only and it should be appreciated that modifications and additions may be made thereto without departing from the scope thereof as defined in the appended claims.

The invention claimed is:

1. A securing apparatus, including a releasing tool, that is only unlocked by rotation of the releasing tool within a release aperture in a deformable body of the securing apparatus and is locked at all other times, comprising:
the deformable body having
a longitudinal axis,
a first aperture centered on said axis configured to provide a secure interference fit with at least one article to which it is fitted,
a bore centered on said axis configured for receiving a shaft, and
at least one stress reduction slot that is substantially perpendicular to the first aperture and bore,
the release aperture having an axis parallel to the first axis, wherein the release aperture having an arcuate section comprising two opposing concave portions centered on two different points of curvature and bisected by a slot perpendicular to the release aperture,
the releasing tool having a camming shaft complementary to the shape of the release aperture such that insertion and rotation of the shaft of the releasing tool within the release aperture will cause the release aperture to spread to a point where the required widening of an area of the release aperture is achieved to unlock the deformable body.

2. A securing apparatus as claimed in claim 1 wherein the body is configured to be permanently fixed to part of an article.

3. A securing apparatus as claimed in claim 1 wherein the body is configured to be fitted to an article that is adjustable in length.

4. A securing apparatus as claimed in claim 1 wherein the body joins a plurality of articles together.

5. A securing apparatus as claimed in claim 1 wherein the body contains a plurality of apertures.

6. A securing apparatus as claimed in claim 5 wherein the securing apparatus is configured to secure a plurality of articles, each of which can be released individually.

7. A securing apparatus as claimed in claim 1 wherein the securing apparatus is constructed as part of an article to which at least one other article is able to be secured.

8. A securing apparatus as claimed in claim 1 wherein at least one article to be secured is tubular.

9. A securing apparatus as claimed in claim 1 wherein at least one article to be secured is solid.

10. A kit for operating a securing device having a deformable body, wherein the body is configured to provide an interference fit with at least one article to which it is fitted, and a release aperture within the body wherein the release aperture is configured to accept a camming shaft of a releasing tool,
the kit comprising:
the securing device having:
a longitudinal axis,
a first aperture centered on said axis configured to provide a secure interference fit with at least one article to which it is fitted,
a bore centered on said axis configured for receiving a shaft, and
at least one stress reduction slot that is substantially perpendicular to the first aperture and bore,
the release aperture having an axis parallel to the first axis, wherein the release aperture having an arcuate section comprising two opposing concave portions centered on two different points of curvature and bisected by a slot perpendicular to the release aperture; and
the releasing tool having a camming shaft complementary to the shape of the release aperture such that insertion and rotation of the shaft of the releasing tool within the release aperture will cause the release aperture to spread to a point where the required widening of an area of the release aperture is achieved to unlock the deformable body.

* * * * *